United States Patent
Tsai et al.

(10) Patent No.: US 6,957,116 B2
(45) Date of Patent: Oct. 18, 2005

(54) QUALITY ASSURANCE SYSTEM AND METHOD

(75) Inventors: Jung-Yi Tsai, Hsinchu (TW); Chao-Yu Chang, Taichung (TW); Chui-Chung Chiu, Changhua (TW); Shu-Jung Tseng, Taichung (TW)

(73) Assignee: Taiwan Semiconductor Manufcturing Co., Ltd., Hsinchu (TW)

( * ) Notice: Subject to any disclaimer, the term of this patent is extended or adjusted under 35 U.S.C. 154(b) by 0 days.

(21) Appl. No.: 10/679,162

(22) Filed: Oct. 3, 2003

(65) Prior Publication Data

US 2005/0075749 A1 Apr. 7, 2005

(51) Int. Cl.⁷ .............................................. G06F 19/00
(52) U.S. Cl. ..................... 700/109; 700/121; 702/84; 702/182
(58) Field of Search ................................. 700/121, 110, 700/98, 108, 109, 95; 250/306; 702/32, 182

(56) References Cited

U.S. PATENT DOCUMENTS

| | | | | |
|---|---|---|---|---|
| 6,314,379 B1 * | 11/2001 | Hu et al. | ...................... | 702/81 |
| 6,618,692 B2 * | 9/2003 | Takahashi et al. | .......... | 702/188 |
| 6,701,259 B2 * | 3/2004 | Dor et al. | ...................... | 702/35 |
| 6,735,493 B1 * | 5/2004 | Chou et al. | .................. | 700/121 |
| 6,763,130 B1 * | 7/2004 | Somekh et al. | ............. | 700/110 |
| 6,839,604 B2 * | 1/2005 | Godfrey et al. | ............. | 700/116 |

* cited by examiner

*Primary Examiner*—Kidest Bahta
(74) *Attorney, Agent, or Firm*—Thomas, Kayden, Horstemeyer & Risley

(57) ABSTRACT

A quality assurance system and method for use between a service provider having a sequence of process stages and a quality assurance stage, and a control center. The service provider performs a plurality of processes on goods at the process stages, transfers engineering data corresponding to the processes to the control center via Internet, and holds the goods at the quality assurance. The control center compares the engineering data with a standard specification, and transfers a confirmation message to the service provider if the engineering data conforms to the standard specification. The service provider may ship the goods to customers after the confirmation message is received.

20 Claims, 4 Drawing Sheets

QUALITY ASSURANCE SYSTEM AND METHOD

BACKGROUND

The present invention relates to a quality assurance system and method, and particularly to a quality assurance system and method that check the quality assurance (QA) of goods on a service provider by a control center via the Internet.

A business model is wellknown as OEM (Original Equipment Manufacturer), in which a product is composed of a plurality of components, and produced by several participators. In addition, in the semiconductor industry, wafers must pass a plurality of process stages in an IC (Integrated Circuit) foundry, and may be tested and packed by a service provider, such as a contractor that concentrates to run test and pack business. After the test, pack and quality assurance stages in the service provider, the wafers become finished goods and are shipped to specific destinations or customers.

The quality issue between the participators is difficult to be controlled and monitored, and there is no mechanism for quality assurance management between the participators. In the conventional mechanism, the quality assurance check is performed respectively and independently, that is the customer fully trusts the service provider's quality assurance check, and performs its own quality assurance check by only checking the surface of the goods.

However, there may be mistakes in the service provider. For example, the service provider may use wrong test programs to circuit probe (CP) test the wafers, thereby affecting the yield and increasing related costs. At TSMC (Taiwan Semiconductor Manufacturing Company), since there are over 50,000 probe wafers that are externally tested by the service provider, a very high potential risk exists if the service provider misses the standard recipes; also, it will impact the business reputation of TSMC and result in money lost for clients.

In addition, the service provider has a sequence of process stages, and the processed goods may be the only quality assurance check in the final stage. Since there is no effect mechanism for early detection of quality fail in real time, the damage may be relative high and the recovery measure used to recover the failed goods may be complicated if the goods are processed by the wrong recipes.

SUMMARY

It is therefore an object of the present invention to provide a system and method that check the quality assurance of goods on a service provider by a control center via the Internet.

It is another object of the present invention to provide an early detection mechanism to discover the quality fail on a service provider in real time.

To achieve the above objectives, the present invention provides a quality assurance system and method. The system includes a service provider and a control center. The service provider has at least a first process stage and a second process stage. The service provider performs a process on goods at the first process stage, transfers engineering data corresponding to the process to the control center via the Internet, and holds the goods at the first process stage. The control center compares the engineering data with a standard specification, and transfers a confirmation message to the service provider if the engineering data conforms to the standard specification. The service provider may release the goods to the second process stage after the confirmation message is received.

In addition, the control center transfers a fail message to the service provider if the engineering data does not conform to the standard specification, and the service provider performs a recovery measure on the goods if the fail message is received.

Further, the quality assurance method first performs a process on goods at a first process stage by the service provider. Then, the service provider transfers engineering data corresponding to the process to the control center via the Internet, and holds the goods at the first process stage. Thereafter, the control center compares the engineering data with a standard specification for confirming quality of the goods. If the engineering data conforms to the standard specification, the control center transfers a confirmation message to the service provider via the Internet. After the confirmation message is received, the service provider releases the goods to a second process stage.

Similarly, the control center transfers a fail message to the service provider if the engineering data does not conform to the standard specification, and the service provider performs a recovery measure on the goods if the fail message is received.

One feature of an embodiment of the present invention is a check of the quality assurance of goods on a service provider by a control center via the Internet. Another feature of an embodiment of the present invention is early detection of the quality fail on the service provider in real time.

BRIEF DESCRIPTION OF THE DRAWINGS

The aforementioned objects, features and advantages of this invention will become apparent by referring to the following detailed description of the preferred embodiment with reference to the accompanying drawings, wherein.

DESCRIPTION

As summarized above, the present invention provides a system and method overcoming conventional quality assurance problems.

As will be appreciated by persons skilled in the art from the discussion herein, the present invention has wide applicability to many manufacturers, factories and industries. For discussion purposes, the embodiments are made herein to semiconductor foundry manufacturing (i.e., wafer fabrication in an IC foundry). However, the present invention is not limited thereto.

Figure 1:
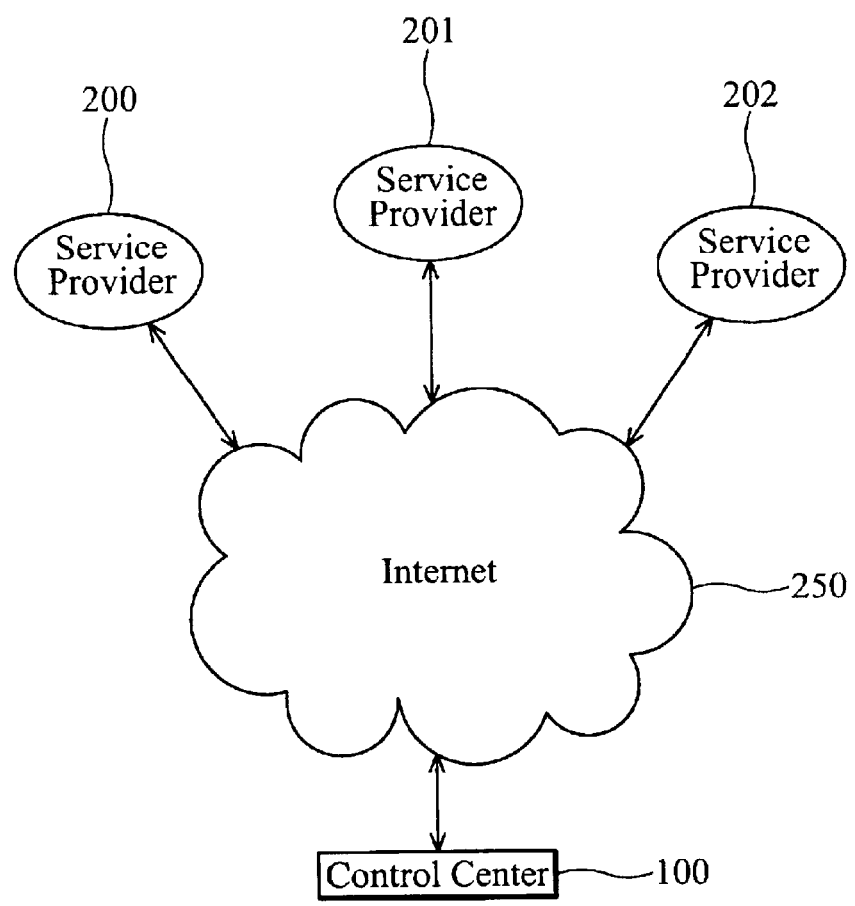
FIG. 1 is a schematic diagram illustrating the architecture of the present invention.

FIG. 1 is a schematic diagram illustrating the architecture of the present invention. The present invention can be applied to worldwide environment through the Internet. As shown in FIG. 1, the system of the present invention includes a control center 100, and a plurality of service providers 200, 201 and 202 coupled with the control center 100 via the Internet 250, in which the control center 100 may be an IC foundry or inside the IC foundry, and the service providers may be contractors of the IC foundry that concentrate to run test and pack business. It is understood that the service providers may apply to any factories, and not be limited thereto.

Figure 2:
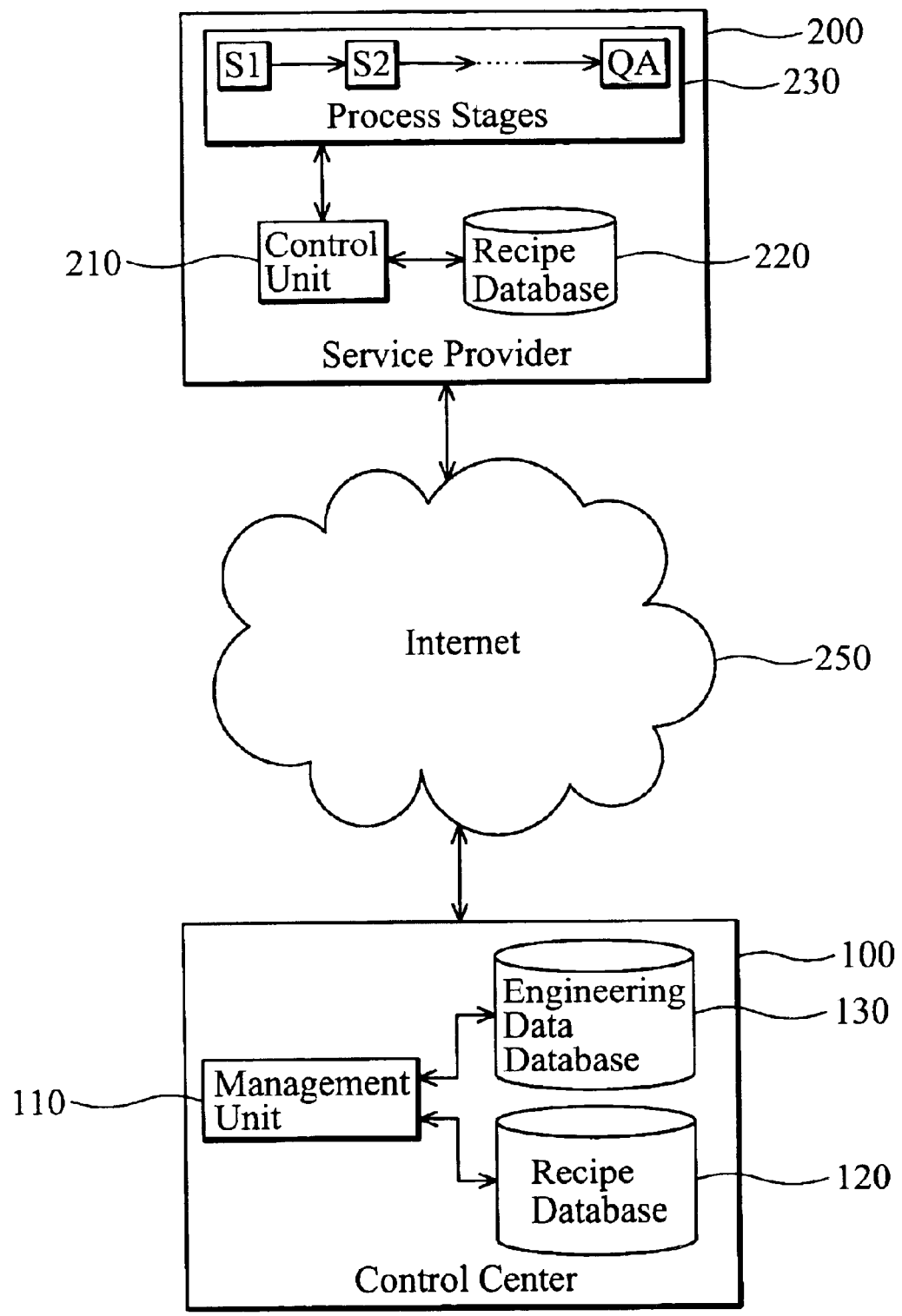
FIG. 2 is a schematic diagram illustrating the system architecture of the quality assurance system according to the present invention.

FIG. 2 is a schematic diagram illustrating the system architecture of the quality assurance system according to the present invention. It is understood that, the operations between one service provider and the control center are discussed in the embodiments, the operations between other service providers and the control center are similar and omitted here.

The quality assurance system includes a control center 100 and a service provider 200 coupled to the control center 100 via the Internet 250. The control center 100 includes a management unit 110, a spec database 120 and an engineering data database 130. The spec database 120 may record standard specifications, such as identities of lots and wafers, stage names of each process stage, and process information, such as test program or name thereof of each process at respective process stages. The engineering data database 130 stores engineering data transferred from the service provider 200.

The service provider 200 has a control unit 210, a recipe database 220 and a sequence of process stages 230 including process stages (S1, S2, . . . ) and a quality assurance stage (QA). The control unit 210 may receive recipes, such as identities of lots and wafers, and test programs of each test process at respective process stages from the control center 100 in advance, and stores it to the recipe database 220. When the wafers need to be circuit probe tested, the control unit 210 may retrieve corresponding recipes from the recipe database 220. In addition, the control unit 210 may collect engineering data corresponding to the processes, and transfers it to the control center 100 for quality assurance check.

Figure 3:
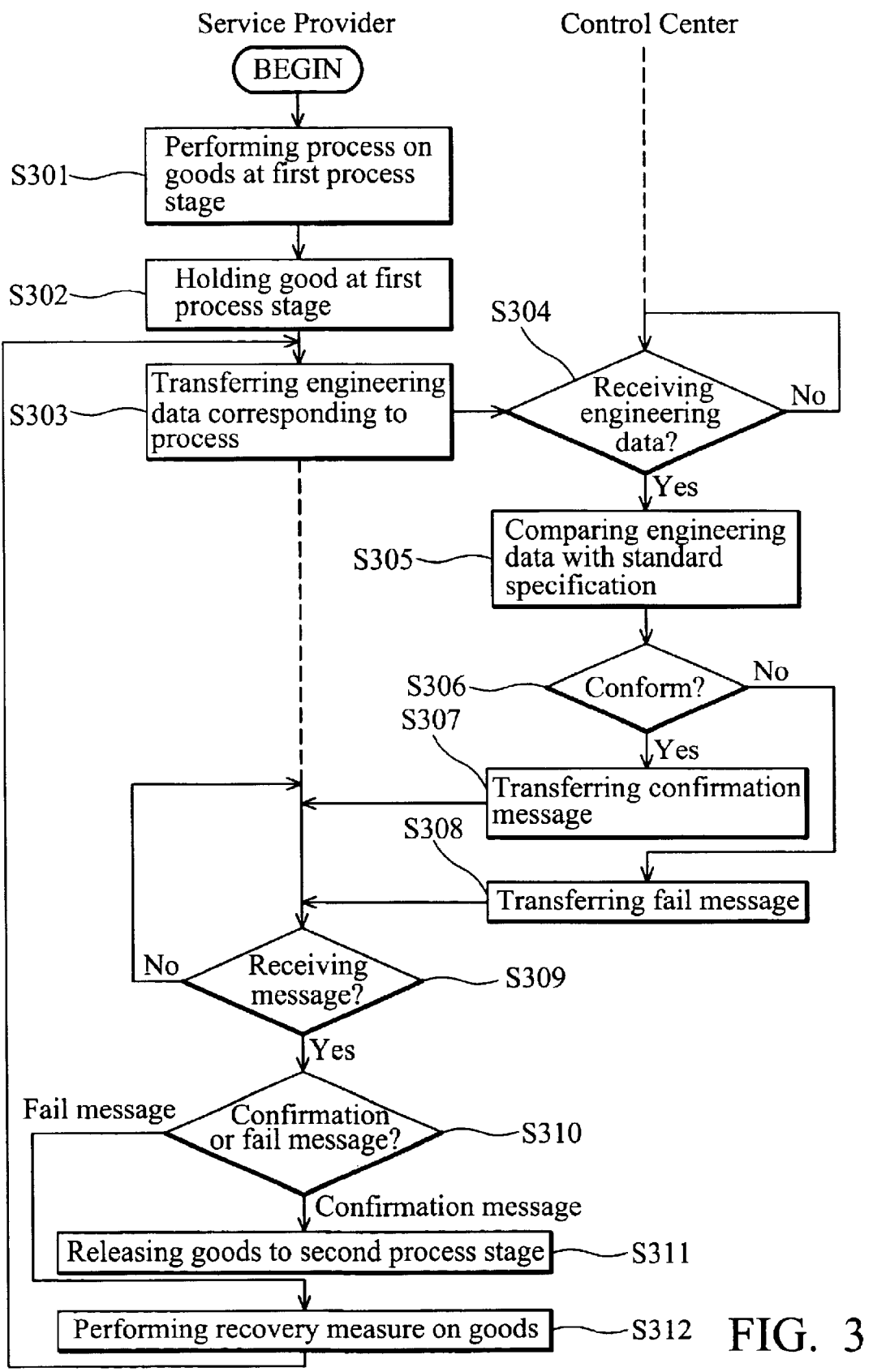
FIG. 3 is a flowchart showing the process of the quality assurance method according to a first embodiment of the present invention.

FIG. 3 is a flowchart showing the process of the quality assurance method according to a first embodiment of the present invention. In the first embodiment, the present invention provides an early detection mechanism to discover the quality fail on each process stage of the service provider 200 in real time.

First, in step S301, the service provider 200 performs a test process on goods (lots of wafers) at the first process stage S1 using a corresponding test program retrieved from the recipe database 220. At the same time, the control unit 210 collects the engineering data corresponding to the test process at the first process stage S1. Then, in step S302, the service provider 200 holds the goods at the first process stage S1, and in step S303, transfers the engineering data to the control center 100 via the Internet 250. Thereafter, in step S309, the service provider 200 checks whether a message is received or not.

In addition, in step S304, the control center 100 checks whether the engineering data is received from the service provider 200. If no (No in step S304), the control center 100 continues the determination of step S304. If the engineering data is received (Yes in step S304), in step S305, the control center 100 stores the engineering data to the engineering data database 130, and compares the engineering data with a standard specification in the spec database 120 for confirming the quality of the goods at the first process stage S1, in which the engineering data may include the identities of the goods, stage name of the first process stage S1, and process information, such as the name of the test program used in the first process stage S1.

If the engineering data conforms to the standard specification (Yes in step S306), in step S307, the control center 100 transfers a confirmation message to the service provider 200 via the Internet 250. Otherwise (No in step S306), in step S308, the control center 100 transfers a fail message to the service provider 200 via the Internet 250.

After the message is received by the service provider 200 (Yes in step S309), in step S310, it is determined that whether the received message is a confirmation message or a fail message. If the received message is a confirmation message, in step S311, the service provider 200 releases the goods to the second process stage S2. If the received message is a fail message, in step S312, the service provider 200 performs a recovery measure on the goods to recover the good, and the flow returns to step S303 for further quality assurance check. It is understood that after the goods are released to the second process stage S2, the flow repeats from steps S301 to S312 again until all of the process stages are finished.

Figure 4:
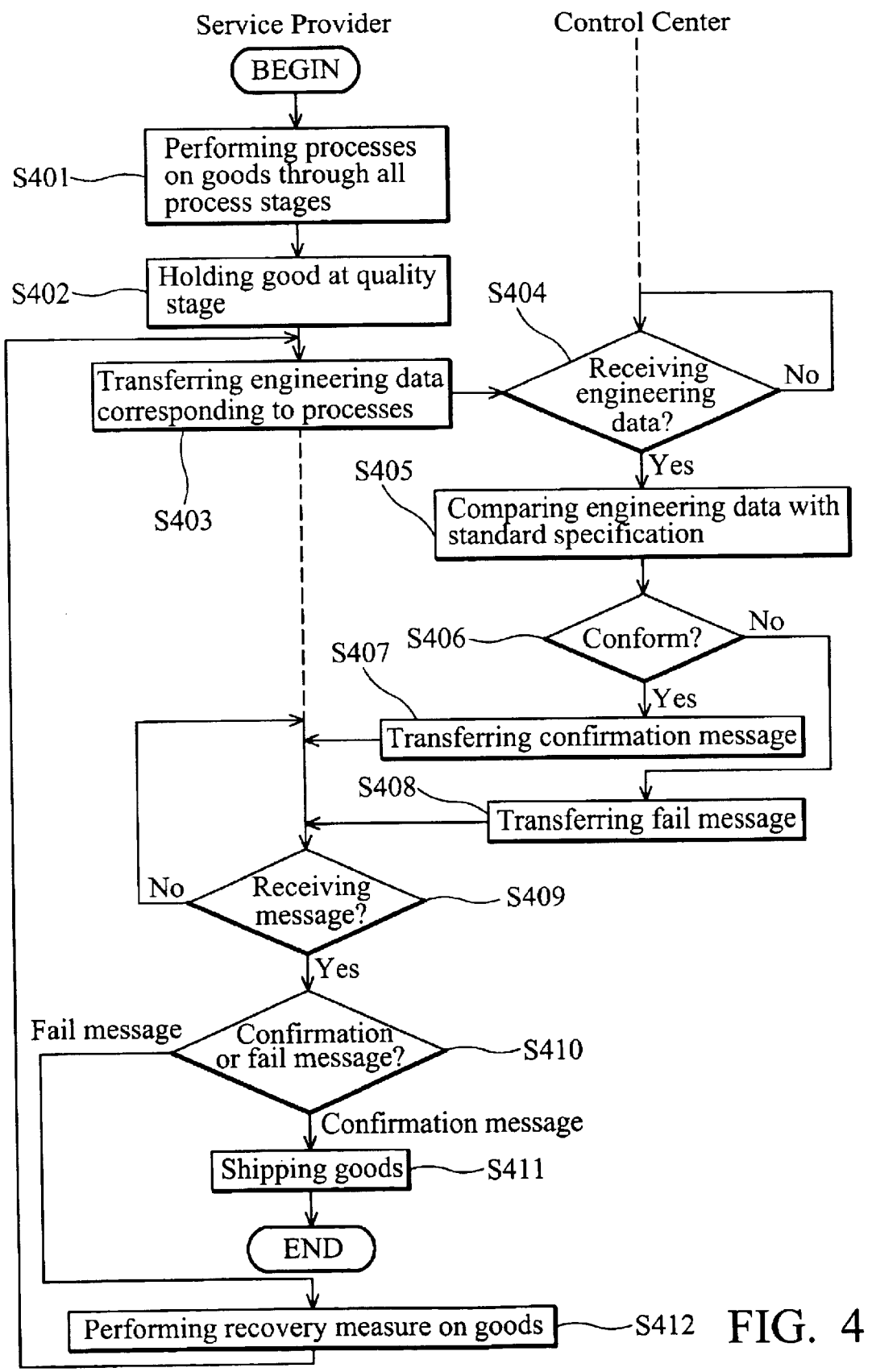
FIG. 4 is a flowchart showing the process of the quality assurance method according to a second embodiment of the present invention.

FIG. 4 is a flowchart showing the process of the quality assurance method according to a second embodiment of the present invention. In the second embodiment, the quality assurance check is performed on the quality assurance stage.

First, in step S401, the service provider 200 performs test processes on goods through all of the process stages using corresponding test programs retrieved from the recipe database 220. At the same time, the control unit 210 collects the engineering data corresponding to the test processes of each process stage. Then, in step S402, the service provider 200 holds the goods at the quality assurance stage, and in step S403, transfers the engineering data to the control center 100 via the Internet 250. Thereafter, in step S409, the service provider 200 checks whether a message is received or not.

In addition, in step S404, the control center 100 checks whether the engineering data is received from the service provider 200. If no (No in step S404), the control center 100 continues the determination of step S404. If the engineering data is received (Yes in step S404), in step S405, the control center 100 stores the engineering data to the engineering data database 130, and compares the engineering data with a standard specification in the spec database 120 for confirming the quality of the goods, in which the engineering data may include the identities of the goods, stage name of the each process stage, and process information, such as the name of the corresponding test program used in respective process stage.

If the engineering data conforms to the standard specification (Yes in step S406), in step S407, the control center 100 transfers a confirmation message to the service provider 200 via the Internet 250. Otherwise (No in step S406), in step S408, the control center 100 transfers a fail message to the service provider 200 via the Internet 250.

After the message is received by the service provider 200 (Yes in step S409), in step S410, it is determined that whether the received message is a confirmation message or a fail message. If the received message is a confirmation message, in step S411, the service provider 200 may ship the goods to specific destinations or customers. If the received message is a fail message, in step S412, the service provider 200 performs a recovery measure on the goods to recover the good, and the flow returns to step S403 for further quality assurance check.

As a result, using the quality assurance system and method according to the present invention, the quality assurance issue between the control center and service providers can be controlled and monitored via the Internet.

In addition, the quality fail of each process stage can be early discovered in real time.

Although the present invention has been described in its preferred embodiments, it is not intended to limit the invention to the precise embodiments disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A quality assurance system, comprising:
    a service provider having at least a first process stage, to perform a process on goods being manufactured at the first process stage, transfer engineering data corresponding to the goods after the process, and hold the goods at the first process stage; and
    a control center coupled to the service provider via Internet to receive the engineering data, compare the engineering data with a standard specification for confirming quality of the goods, transfer a confirmation message to the service provider if the engineering data conforms to the standard specification, and transfer a fail message to the service provider if the engineering data does not conform to the standard specification.
    such that the service provider releases the goods for further operations after the confirmation message is received and performs a recovery measure on the goods if the fail message is received.

2. The system as in claim 1 wherein the engineering data comprises identity of the goods, stage name of the first process stage, and process information of the process at the first process stage.

3. The system as in claim 2 wherein the process information comprises a recipe used in the first process stage.

4. A quality assurance method for use between a service provider and a control center, comprising the steps of:
    performing of a process on goods being manufactured at a first process stage by the service provider;
    transferring of engineering data corresponding to the goods after the process to the control center via Internet, and holding of the goods at the first process stage by the service provider;
    comparison of the engineering data with a standard specification for confirming quality of the goods by the control center;
    transferring of a confirmation message to the service provider via the Internet by the control center if the engineering data conforms to the standard specification;
    transferring of a fail message to the service provider by the control center if the engineering data does not conform to the standard specification;
    release of the goods for further operations by the service provider after the confirmation message is received; and
    performing of a recovery measure on the goods by the service provider if the fail message is received.

5. The method as in claim 4 wherein the engineering data comprises identity of the goods, stage name of the first process stage, and process information of the process at the first process stage.

6. The method as in claim 5 wherein the process information comprises a recipe used in the first process stage.

7. A quality assurance system, comprising:
    a service provider having a sequence of process stages and a quality assurance stage, to perform a plurality of processes on goods being manufactured at the process stages, transfer engineering data corresponding to the goods after the processes, and hold the goods at the quality assurance; and
    a control center coupled to the service provider via Internet to receive the engineering data, compare the engineering data with a standard specification, transfer a confirmation message to the service provider if the engineering data conforms to the standard specification, and transfer a fail message to the service provider if the engineering data does not conform to the standard specification,
    such that the service provider ships the goods after the confirmation message is received and performs a recovery measure on the goods if the fail message is received.

8. The system as in claim 7 wherein the engineering data comprises identity of the goods, stage name of each process stage, and process information of each process at respective process stages.

9. The system as in claim 8 wherein the process information comprises a recipe used in each process stage.

10. A quality assurance method for use between a service provider and a control center, in which the service provider has a sequence of process stages and a quality assurance stage, comprising the steps of:
    performing of a plurality of processes on goods being manufactured at the process stages by the service provider;
    transferring of engineering data corresponding to the goods after the processes to the control center via Internet, and holding of the goods at the quality assurance stage by the service provider;
    comparison of the engineering data with a standard specification by the control center;
    transferring of a confirmation message to the service provider via the Internet by the control center if the engineering data conforms to the standard specification;
    transferring of a fail message to the service provider by the control center if the engineering data does not conform to the standard specification;
    shipping of the goods by the service provider after the confirmation message is received; and
    performing of a recovery measure on the goods by the service provider if the fail message is received.

11. The method as in claim 10 wherein the engineering data comprises identity of the goods, stage name of each process stage, and process information of each process at respective process stages.

12. The method as in claim 11 wherein the process information comprises a recipe used in each process stage.

13. A quality assurance system, comprising:
    a contractor having a sequence of process stages and a quality assurance stage, to perform a plurality of test processes on at least one wafer at the process stages, transfer engineering data corresponding to the wafer after the processes, and hold the wafer at the quality assurance; and
    an IC (integrated circuit) foundry coupled to the service provider via Internet to receive the engineering data, compare the engineering data with a standard specification, transfer a confirmation message to the contractor if the engineering data conforms to the standard specification, and transfer a fail message to the contractor if the engineering data does not conform to the standard specification, such that the contractor ships the wafer after the confirmation message is received and performs a recovery measure on the wafer if the fail message is received.

14. The system as in claim 13 wherein the engineering data comprises identity of the wafer, stage name of each process stage, and process information of each process at respective process stages.

15. The system as in claim 14 wherein the process information comprises a test program used in each process stage.

16. The system as in claim 13 wherein the test processes are circuit probe tests.

17. A quality assurance method for use between a contractor and an IC (integrated circuit) foundry, in which the contractor has a sequence of process stages and a quality assurance stage, comprising the steps of:

performing of a plurality of test processes on at least one wafer at the process stages by the contractor;

transferring of engineering data corresponding to the wafer after the processes to the IC foundry via Internet, and holding of the wafer at the quality assurance stage by the contractor;

comparison of the engineering data with a standard specification by the IC foundry;

transferring of a confirmation message to the contractor via the Internet by the IC foundry if the engineering data conforms to the standard specification;

transferring of a fail message to the contractor by the IC foundry if the engineering data does not conform to the standard specification;

shipping of the wafer by the contractor after the confirmation message is received; and performing of a recovery measure on the wafer by the contractor if the fail message is received.

18. The method as in claim 17 wherein the engineering data comprises identity of the wafer, stage name of each process stage, and process information of each process at respective process stages.

19. The method as in claim 18 wherein the process information comprises a test program used in each process stage.

20. The method as in claim 17 wherein the test processes are circuit probe tests.

* * * * *